(12) United States Patent
Boss et al.

(10) Patent No.: US 9,106,966 B2
(45) Date of Patent: Aug. 11, 2015

(54) MULTI-DIMENSIONAL CHANNEL DIRECTORIES

(71) Applicant: International Business Machines Corporation, Armonk, NY (US)

(72) Inventors: Gregory J. Boss, Saginaw, MI (US); James R. Kozloski, New Fairfield, CT (US); Clifford Alan Pickover, Yorktown Heights, NY (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 14/030,521

(22) Filed: Sep. 18, 2013

(65) Prior Publication Data

US 2014/0173663 A1 Jun. 19, 2014

Related U.S. Application Data

(63) Continuation of application No. 13/714,619, filed on Dec. 14, 2012, now abandoned.

(51) Int. Cl.
*G06F 3/0488* (2013.01)
*H04N 21/482* (2011.01)
*G06F 3/0481* (2013.01)
*G06F 3/0482* (2013.01)
(Continued)

(52) U.S. Cl.
CPC ............ *H04N 21/482* (2013.01); *G06F 3/0482* (2013.01); *G06F 3/0488* (2013.01); *G06F 3/04815* (2013.01); *H04N 21/4312* (2013.01); *H04N 21/4821* (2013.01); *H04N 21/8133* (2013.01)

(58) Field of Classification Search
CPC ................... H04N 21/23109; H04N 21/4126; H04N 21/41407; H04N 21/42224; H04N 21/4314; H04N 21/4332; H04N 21/4312; G06F 3/04815; G06F 3/0482; G06F 3/0488
USPC ..................................................... 725/39, 52
See application file for complete search history.

(56) References Cited

U.S. PATENT DOCUMENTS

| | | |
|---|---|---|
| 6,750,864 B1 | 6/2004 | Anwar |
| 7,714,862 B1 | 5/2010 | Dwyer et al. |
| 8,020,183 B2 | 9/2011 | Ferman et al. |

(Continued)

OTHER PUBLICATIONS

O. A. Omojokun et al., "Towards automatic personalization of device controls," IEEE Transactions on Consumer Electronics, vol. 55, Issue 1, Feb. 2009, pp. 269-276.

(Continued)

*Primary Examiner* — Dominic D Saltarelli
(74) *Attorney, Agent, or Firm* — Fleit Gibbons Gutman Bongini & Bianco PL; Jon A. Gibbons

(57) ABSTRACT

Disclosed is a novel system and method for presenting a listing of multimedia content. The method begins with accessing a multi-dimensional data space with a plurality of nodes. Each of the nodes in the multi-dimensional data space contains a set of informational descriptors about multimedia content. User input is received for least one dimension of relatedness to be used with the set of informational descriptors. A subset of the plurality of nodes is defined with the at least one dimension of relatedness using an order embedding algorithm and the user input. The subset of the plurality of nodes is presented to the user.

20 Claims, 10 Drawing Sheets

(51) Int. Cl.
*H04N 21/431* (2011.01)
*H04N 21/81* (2011.01)

(56) References Cited

U.S. PATENT DOCUMENTS

| 8,613,015 | B2 | 12/2013 | Gordon et al. |
| 2002/0007488 | A1 | 1/2002 | Kikinis et al. |
| 2005/0108217 | A1 | 5/2005 | Werner et al. |
| 2006/0254409 | A1 | 11/2006 | Withop |
| 2007/0024017 | A1 | 2/2007 | Ramsey |
| 2007/0220108 | A1 | 9/2007 | Whitaker |
| 2008/0320515 | A1 | 12/2008 | Sloo |
| 2008/0320517 | A1 | 12/2008 | Beadle et al. |
| 2009/0307631 | A1 | 12/2009 | Kim et al. |
| 2010/0071000 | A1 | 3/2010 | Amento et al. |
| 2010/0138864 | A1 | 6/2010 | Yoakum |
| 2011/0225196 | A1 | 9/2011 | Haseyama |

OTHER PUBLICATIONS

F. Sanchez-Zamora et al., "Visualizing tags as a network of relatedness," 39th IEEE Frontiers in Education Conference, FIE '09, Oct. 18-21, 2009, 6 pages.

Y. Zhang et al., "Research on the cloud computing oriented recommender system model for mobile commence," 2nd International Conference on Artificial Intelligence, Management Science and Electronic Commerce (AIMSEC), Aug. 8-10, 2011, pp. 5124-5127.

H. Liu et al., "Interestmap: Harvesting social network profiles for recommendations," Workshop: Beyond Personalization, IUI'05, Jan. 9, 2005, San Diego, California, 6 pages.

Non Final Office Action dated Aug. 16, 2013 received for U.S. Appl. No. 13/714,619.

Final Office Action dated Feb. 5, 2014 received for U.S. Appl. No. 13/714,619.

| 102 | 104 | 106 | 108 | 110 | 112 | 114 | 116 | 118 | 120 | 122 |
|---|---|---|---|---|---|---|---|---|---|---|
| SOURCE | TIME | GENRE | CATEGORY | REVIEW | LENGTH | TITLE | RATING | HD | 3D | ACTORS |
| CHANNEL 1 | HH:MM | HORROR | MOVIE | 5 | HH:MM | | R | Y | N | NAME 1 |
| CHANNEL N | On Demand | SCIENCE | TALK SHOW | 15 | HH:MM | | PG13 | N | N | NAME 2 |
| ... | ... | ... | ... | ... | ... | ... | ... | ... | ... | ... |
| WEBSITE 1 | On Demand | POLITICAL SCIENCE | NEWS | 100 | HH:MM | | PG13 | N | N | NAME 3 |
| WEBSITE N | HH:MM | BUSINESS | NEWS | 4 | HH:MM | | G | Y | Y | NAME 4 |
| ... | ... | ... | ... | ... | ... | ... | ... | ... | ... | ... |

152, 154, 156, 158, 160, 162

| 124 | 126 | 128 | 130 | 132 | 134 | 136 | 138 | 140 | 142 | 144 |
|---|---|---|---|---|---|---|---|---|---|---|
| DIRECTOR | RELEASE DATE | RANKING | CURRENT VIEWERS | DEMOGRAPHICS | SOCIAL MEDIA | | | | | |
| NAME 21 | MM/DD/YY | 25 | 40,000 | ZIP, AGE, GENDER | | | | | | |
| NAME 22 | MM/DD/YY | 3 | 13,000 | ZIP, AGE, GENDER | | | | | | |
| ... | ... | ... | ... | ... | | ... | ... | ... | ... | ... |
| NAME 23 | MM/DD/YY | 100 | 5,000 | ZIP, AGE, GENDER | | | | | | |
| NAME 24 | MM/DD/YY | 10 | 12,000 | ZIP, AGE, GENDER | | | | | | |
| ... | ... | ... | ... | ... | | ... | ... | ... | ... | ... |

MULTI-DIMENSIONAL CHANNEL DIRECTORIES

CROSS-REFERENCE TO RELATED APPLICATIONS

This application is based upon and claims priority from prior U.S. patent application Ser. No. 13/714,619, filed on Dec. 14, 2012, now abandoned, the entire disclosure of which is herein incorporated by reference in its entirety.

BACKGROUND

The present invention generally relates to directory listings and more specifically to directory listing used for browsing multimedia content.

Most cable providers present a listing of their channel lineup to viewers. Often these channel listing are available on line and in print. These listing in grids are based on half-hour or hourly time slots to enable users to quickly browser available content. More recently, many content providers include interactive searching of channel listing through websites, cable or satellite systems. Many times, these listings are can be searched by keyword, program name, episode title, cast and crew, user rating, genre, high definition (HD) versus non-HD, or a combination of these parameters.

These interfaces, although useful, do not take into account other information about the user including a user's preferences. Moreover, current channel listings are very cumbersome and unintelligent and make it difficult for a user to find the programming they want.

BRIEF SUMMARY

Disclosed is a novel system and method for using dynamic ordering to graphically display and navigate (i.e. "channel-surf") multimedia content, such as broadcast, cable, satellite, web-based, audio, and video programs such as television and radio shows. The method begins with accessing a multi-dimensional data space with a plurality of nodes. Each of the nodes in the multi-dimensional data space containing a set of informational descriptors about multimedia content. User input is received for least one dimension of relatedness to be used with the set of informational descriptors. A subset of the plurality of nodes is defined with the at least one dimension of relatedness using an order embedding algorithm and the user input. The subset of the plurality of nodes is presented to the user.

In one example, the multi-dimensional data space with the plurality of nodes includes is accessed from a provider of the multimedia content, such as a website, a broadcaster, a satellite provider, a social network, or a combination thereof.

In another example, the informational descriptors includes a genre of the multimedia content, a title of the multimedia content, a length of the multimedia content, closed captioning content, reviews of the multimedia content, Motion Picture Association of America (MPAA) rating of the multimedia content, directors of the multimedia content, writers of the multimedia content, actors in the multimedia content, title of multimedia content, and release date of the multimedia content.

In yet another example, the order embedding algorithm includes using an interest of a user. The order embedding algorithm is at least one of an elastic map algorithm, a topographic ICA algorithm, and a Kohonen algorithm. In the case the order embedding algorithm is the elastic map algorithm with an approximation energy (spring constant) set to relatedness of the nodes in the subset of the plurality of nodes.

In still another example, the user input includes receiving user input from at least of one of a mouse, a keyboard, a remote control, a touch screen, voice, and a user gesture.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 1 is a multi-dimensional data table of with each row representing a node containing informational descriptor about multimedia content;

DETAILED DESCRIPTION

Figure 2:
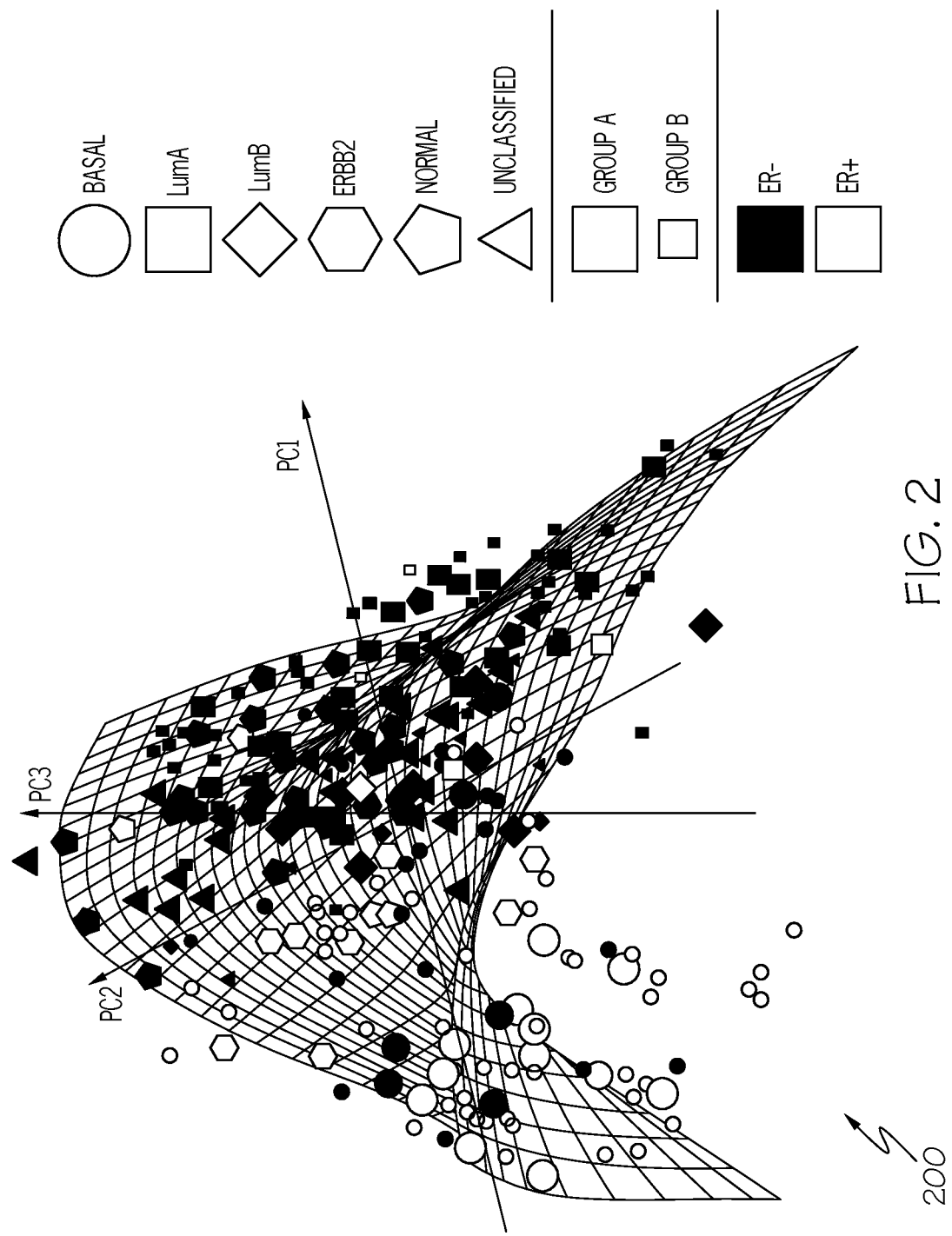
FIG. 2 is three-dimensional plot of linear principal component analysis (PCA) for visualization of multi-dimensional data using an order embedding algorithm with of FIG. 1.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As used herein, a "multimedia content" is defined as text, graphics, audio, video or a combination thereof, delivered through broadcast, cable, satellite, streaming, web-cast, and videoconferencing, or a combination thereof. The term "multi-dimensional data" is two or more data descriptors for multimedia content as described further below.

Disclosed is a novel system and method is described for using dynamic ordering to graphically display and navigate (i.e. "channel-surf") multimedia content, such as broadcast, cable, satellite, web-based, audio, and video programs such as television, radio shows and video conferences. Graphical formats and approaches may include multi-dimensional tabular formats, circular formats, cluster formats, Thinkmap, Visuwords, or a combination thereof. The present invention makes use of an order embedding algorithm for nonlinear dimensionality reduction including, an elastic map, Sammon's map, Kohonen map, or a combination thereof.

Turning now to FIG. 1, shown is a multi-dimensional data table 100 of with each row 152 through 162 representing a node containing example informational descriptor about multimedia content. The multimedia content descriptor can include any or all of the information listed in columns 102 through 144. These example informational descriptors include:
- 102 SOURCE—the origin of the multimedia content, broadcast channel, website, satellite, etc.
- 104 TIME—broadcast or webcast time or on demand.
- 106 GENRE—a category of artistic endeavor having a particular form, content, or technique.
- 108 CATEGORY—a classification, such as, movie, talk show, sports, or news.
- 110 REVIEW—viewers rating, typically on scale such as 1 to 5 with 5 being the best.
- 112 LENGTH—length of multimedia presentation classification, such as, movie, talk show, sports, or news.
- 114 TITLE—a heading, caption or descriptive name.
- 116 RATING—a designator, such as the MPAA designator, of multimedia content including graphical violence, offensive language, and sex.
- 118 HD—High Definition designator that the video is of higher resolution than typical broadcast resolution.
- 120 3D—Three-Dimensional designator that the video is capable of being viewed in 3D.
- 122 ACTORS (s)—The name of the person or persons who acts in the multimedia content.
- 124 DIRECTOR (s)—The name of the person or persons who is responsible for the interpretive aspects of the multimedia data.
- 126 RELEASE DATE—The date when the multimedia content was made available.
- 128 RANKINGS—The relative position of the multimedia content in terms of a metric such as popularity, length, violence, etc.
- 130 CURRENT VIEWS—The number of others viewing or listening to the multimedia content.
- 132 DEMOGRAPHICS—Social statistics including zip code, age, gender of the audience viewing or listening to the multimedia content.
- 134 SOCIAL MEDIA—network based technologies that enables dialog between viewers including Twitter, Facebook, and others.
- 134 through 144—Other informational descriptors.

Figure 3:
FIG. 3 is two-dimensional plot of linear principal surface coordinates of FIG. 2.

The multidimensional data table 100 from FIG. 1 is used as an input to an embedding algorithm including an elastic map, Sammon's map, and Kohonen map. In the case of an elastic map, a multi-dimensional data visualization tool, such as ViDaExpert, available at online URL (http://bioinfo-out.curie.fr/projects/vidaexpert/) can be used to visualize the multi-dimensional data table 100. As an example, FIG. 2 is three-dimensional plot of linear principal component analysis (PCA) for visualization of multi-dimensional data using an order embedding algorithm with the informational descriptors from the multi-dimensional data table 100 of FIG. 1. FIG. 3 is an example two-dimensional plot 300 of linear principal surface coordinates of FIG. 2.

This visualization of multi-dimensional data is used to present "nodes", represented by rows in the multi-dimensional data table 100 to users. It is important to note that SOURCES 102 may be presented in a multi-dimensional grid, a graphical tree structure, a hub and spoke arrangement, an elastic map, Thinkmap, Visumap, or a combination of these. Different presentation examples are now described.

Figure 4:
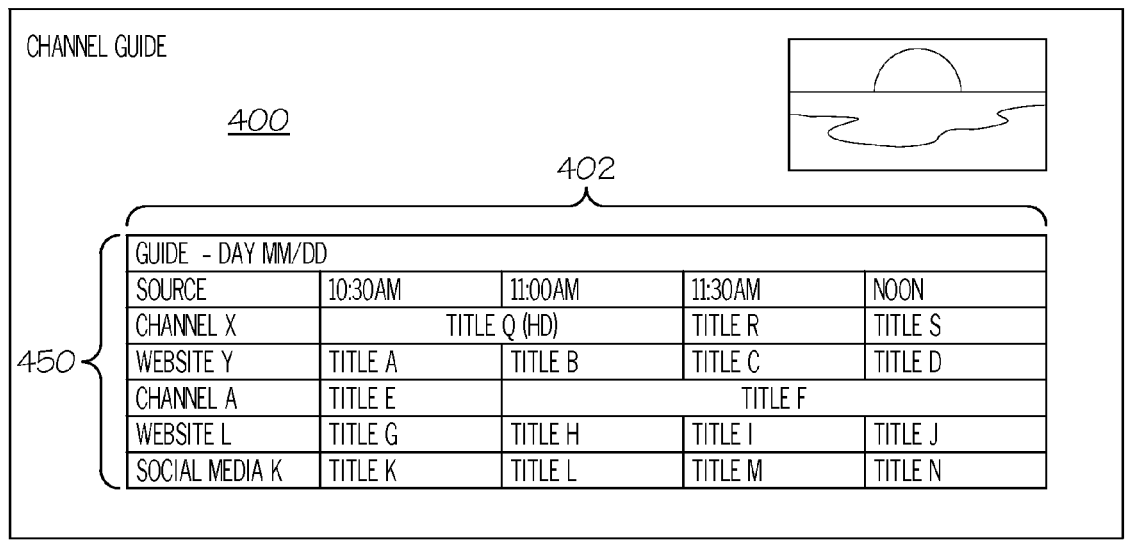
FIG. 4 is a first presentation in a tabular arrangement of a multimedia guide or channel guide using a subset of the table entries from FIG. 1.

FIG. 4 is a first presentation example in a tabular arrangement 400 of a multimedia guide or channel guide using a subset of the table entries from FIG. 1. This presentation example represents a typical electronic program guide typically presented by cable companies, newspapers, and satellite providers. On the top 402 are TIME 104 of the broadcast and on the left-side 450 SOURCES 102. However, unlike traditional channel guides, the SOURCES 102 source may be a broadcast or satellite channel, a website, or a social media feed.

Note that the ordering may be in n-dimensions, and a user may navigate this higher dimensional graph of SOURCES 102 or channels using a standard input device suitable for multi-dimensional navigation, such as a touch screen, joystick, remote control, etc. After updating of the order embedding algorithm, the SOURCES 102 are partitioned into actual recommendations for channel viewing based on proximity to one another and to the users "node" within the embedding algorithm. As a result of the partition, the SOURCES 102 presented represents the user's interests and past viewing content and its proximity to other multimedia content. The node closest to a centroid of the user's partition may then be used as the starting point for navigation or channel surfing. In one example, a function is selected by the user "I'm feeling lucky" switches from one SOURCES 102 to another automatically based on this analysis. Centroids of other partitions may be targeted for overviews of the multimedia content in this "region" within the embedding algorithm, and thereby a user can navigate a multitude of SOURCES 102 using a hierarchical, self-organized network, complete with automatically generated content encapsulations and associated advertising.

In one example, the present invention provides a multi-dimensional navigation or channel-surfing method that employs a relatedness-detection unit to assess possible relationships among SOURCES 102 based on any combination of a text analysis of closed-caption information, actors names, facial recognition on characters in TV shows, name of TV show, textual information often associated with TV show descriptions when using a set-top box, MPAA ratings (e.g. PG-13 versus R) of movies, crowdsourcing of colleagues in a social network, reviews of movies, etc. Non-limiting examples of navigation include:

- A user navigates left-right instead of up-down, the user navigates SOURCES 102 recommended by colleagues in his social network;
- A user navigates left-right instead of up-down, the user navigates SOURCES 102 currently showing ACTOR Z, with a PG-13 ratings;
- A user navigates left-right instead of up-down, the user navigates SOURCES 102 in his demographic (e.g. New Yorkers);
- A user navigates left-right instead of up-down, the user navigates SOURCES 102 on politics or science; and
- A user navigates left-right instead of up-down, the user navigates SOURCES 102 that most people are watching.

Using a collection of potential SOURCES 102 to be surfed, a relatedness using an order embedding algorithm may be computed based on multimedia content and the probability of an individual's interest in a particular channel based on analysis of a user's profile and watching behavior. An ordering of SOURCES 102 or nodes is then computed. The SOURCES 102 may be presented in a multi-dimensional grid, a graphical tree structure, a hub and spoke arrangement, an elastic map, or a combination of these. The presentation can be dynamically ordered based on real-time data from social networks and other sources.

In the example when the order embedding algorithm is an elastic map, the distance D needed to channel surf may depend on a relatedness value V. For example, nearby SOURCES 102 have a low D value may be very related, whereas SOURCES 102 further away may be much less related with a higher D value. Stated differently, a low value of D is a higher degree of relatedness.

Users may manually configure their preference settings or the user may detect user preferences based on user behavior, utilize preferences from external sources (i.e. social networks). Using a learning algorithm or other techniques, the system "learns" user's preferences over time. The user's preferences can also be stored in a particular region of local storage on an end-user device, such as a smart phone or tablet computer. In this self-learning mode, the user doesn't have to specify very much in terms of "personal preferences" if his right-left arrows surf whatever is "very popular at the moment" or "shows that his social network likes".

The system may learn user preferences by observing past surfing and/or viewing history. As a simple example, if a user has frequently watched TV shows with a certain kind of content or a certain set of actors, these may be judged to be possible preferences. These preferences may be stored as text tags in a database that is accessible on a local-set top box or on a computing cloud. For instance, the system learns that a user is interested in shows on "astronomy". This learning is based on latent semantic indexing of words or descriptive content associated with TV shows, such as the informational descriptors in the multi-dimensional data table 100 of FIG. 1. The order embedding algorithm is used to create and present a sub-set of sources to the user.

The system is aware that the SOURCES 102 the user is requesting is in the middle of a commercial, it takes the user to another source or leaves the user on the other source until commercial is over and then moves you. This enables the user to plan a trip through SOURCES 102 that avoids commercials.

The preferences recorded will be compared to metadata or informational descriptors associated with each of the shows in the electronic program guide including: genre, actors, producer, key words, user ratings, length of movie, number of times watched, time of day and day of week watched, a user's preferred multi-dimensional criteria, etc. Once the user selects a source to view a program the informational descriptor is analyzed along with the user's preferences. The analysis determines which of the other programs will be grouped into one or more dimensions of relatedness. For example, if a user lists "genre" as more important than "actors" when they select a romantic drama with Actor C the first dimensional vector will have other romantic drama's to choose from. If however the user selects "Actors" as a higher priority than "Genre" the dimensional vector will contain other shows with Actor C in it even if those shows are Action or Sci Fi. etc.

Figure 5:
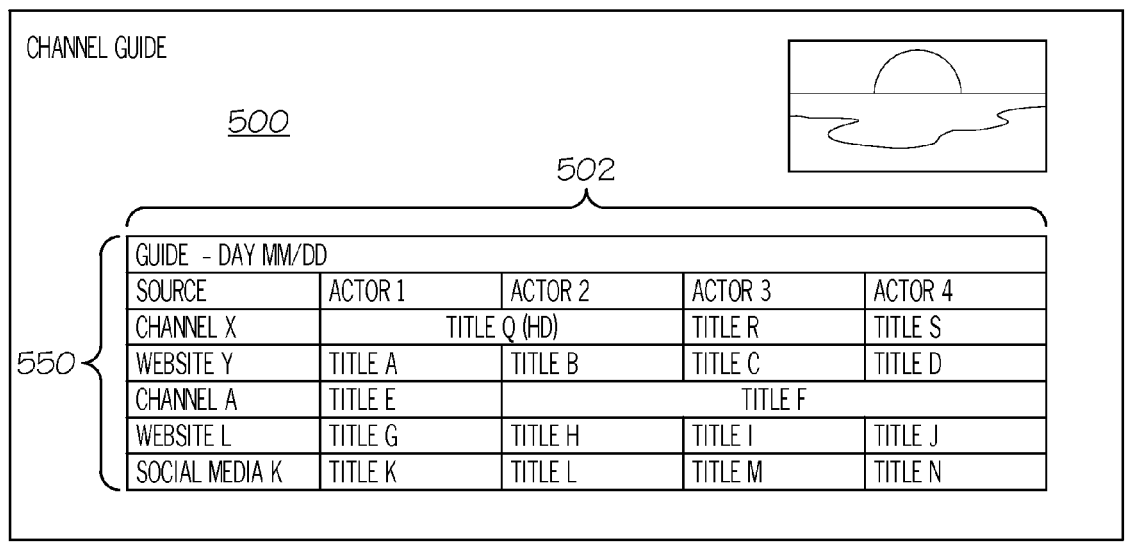
FIG. 5 is a second presentation in a tabular arrangement of a multimedia guide or channel guide using a subset of the table entries from FIG. 1.

FIG. 5 is a second presentation example a tabular arrangement 500 of a multimedia guide or channel guide using a subset of the multi-dimensional data table 100 from FIG. 1. In this example the ACTOR 122 is a sorting and presentation criteria on the top 502. The source of the multimedia content is shown along the left-side 550.

Figure 6:
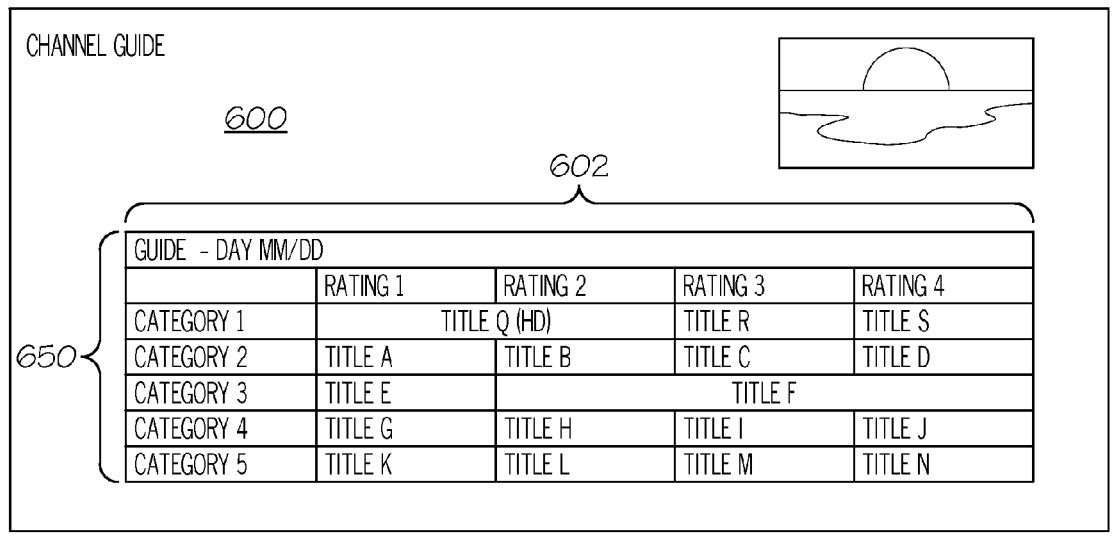
FIG. 6 is a third presentation in a tabular arrangement of a multimedia guide or channel guide using a subset of the table entries from FIG. 1.

FIG. 6 is a third presentation in a tabular arrangement 600 of a multimedia guide or channel guide using a subset of the multi-dimensional data table 100 from FIG. 1. In this example the RATING 116 is a sorting and presentation criteria on the top 602. The source of the multimedia content is shown along the left-side 650. In all these presentation examples, the user can navigate in two or more dimensions. For example in FIG. 6, the user can navigate both vertically and horizontally. When a channel that the user likes, e.g. news, the user can navigate horizontally over Categories 650 to see other SOURCES 102 that are "similar" to that one. The similarity could be based on any combination of informational descriptors in the multi-dimensional data table 100. A user currently viewing multimedia content from a given source about the presidential election, may navigate horizontally to view other sources of multimedia content that are showing presidential election coverage. Similarly, a commercial on a new sports car might be showing and horizontal navigation may take the user to a program related to automobile reviews or car repair.

Figure 7:
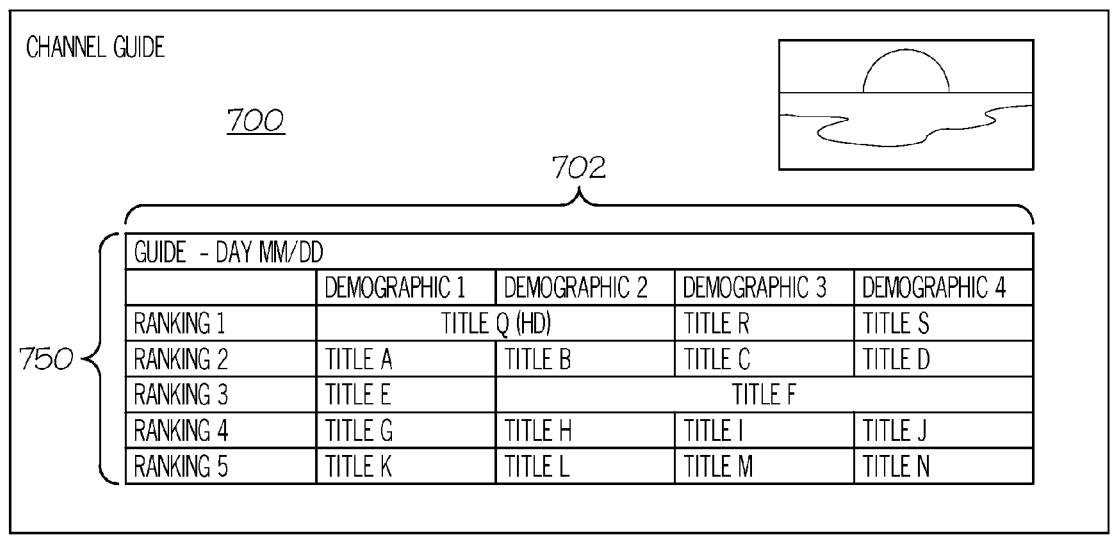
FIG. 7 is a fourth presentation in a tabular arrangement of a multimedia guide or channel guide using a subset of the table entries from FIG. 1.

FIG. 7 is a fourth presentation in a tabular arrangement 700 of a multimedia guide or channel guide using a subset of the multi-dimensional data table 100 from FIG. 1. In this example the DEMOGRAPHICS 132 is a sorting and presentation criteria on the top 702. The source of the multimedia content is shown along the left-side 650.

Figure 8:
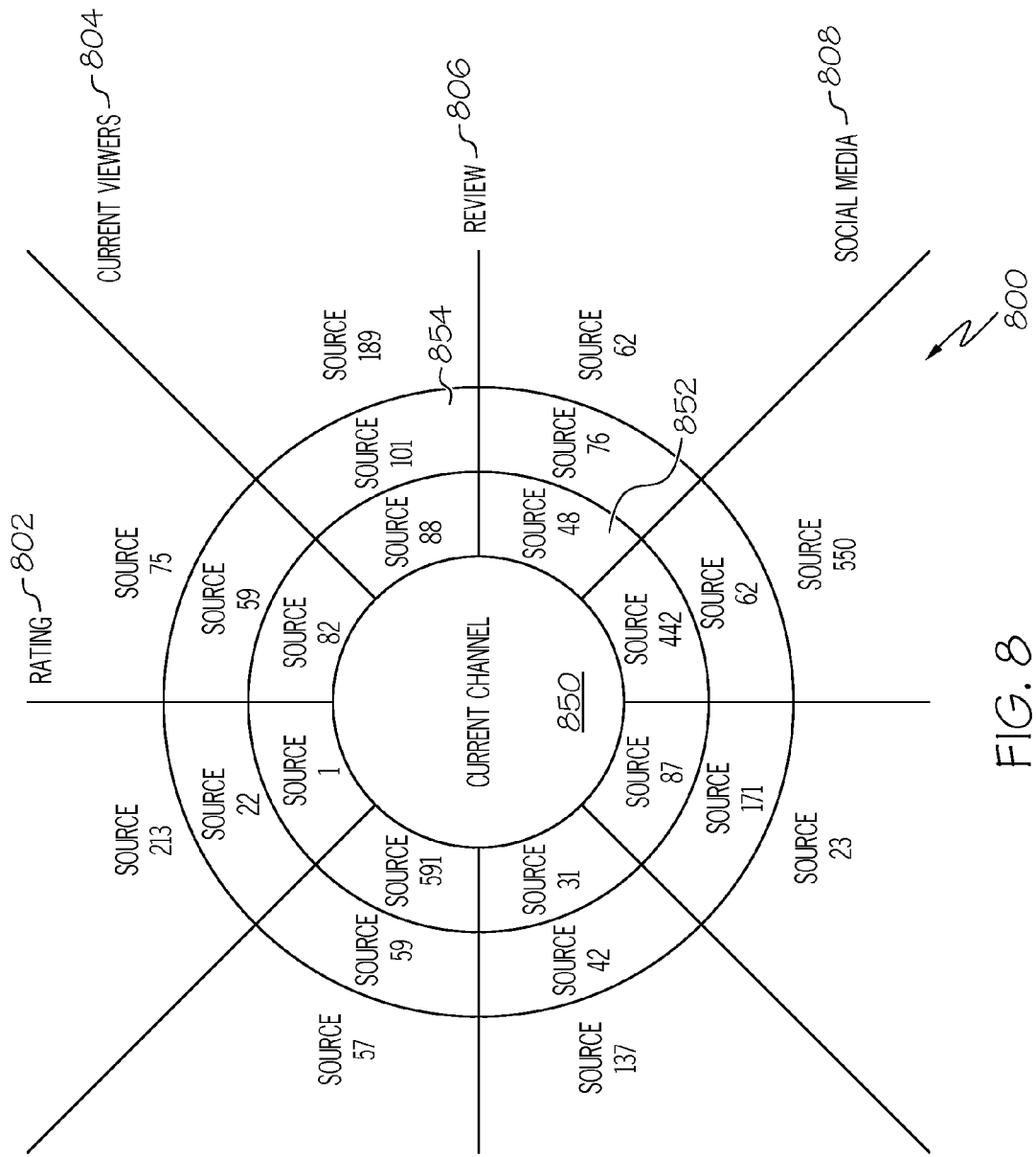
FIG. 8 is a presentation in a circular arrangement of a multimedia guide or channel guide using a subset of the table entries from FIG. 1.

FIG. 8 is a presentation in a circular arrangement 800 of a multimedia guide or channel guide using a subset of the of the multi-dimensional data table 100 from FIG. 1. In this user interface example, the current channel is shown in the center 850. Each concentric ring or concentric circle 852 through 854 is a cluster or grouping corresponding SOURCE of informational descriptors (i.e. columns of multi-dimensional data table 100) along axis of RATING 802, CURRENT VIEWERS 804, REVIEW 806, and SOCIAL MEDIA 808. Using this interface a user can quickly navigate along an axis 802 through 808 to locate multimedia content sources to meet a desired criterion. In one example, the user can dynamically change, add, or delete, an informational descriptor to allow customization. Moreover, for dynamic informational descriptors such as SOCIAL MEDIA 134 and CURRENT VIEWERS 130, the center as the current channel 850 can represent an average, peak or minimum value settable by the viewer. For example, a first user may want the SOURCES 102 with the highest number of CURRENT VIEWERS 130 to be in the center as the current channel 850. And a second view want the center channel 850 to be SOCIAL MEDIA 134 feed for certain topic.

In one example the present invention, navigation or channel surfing may be extended beyond traditional TV surfing that involves content currently being broadcast, and it may include multimedia and broadcast content at times other than being broadcast at the time the user is surfing. For example, the user may surf content that has been broadcast two hours previously (e.g. content that is stored and available) or two hours in the future (e.g. however, receive only a promotional segment for the actual piece). This may be considered, at a high level, to be surfing the past and the future.

To map and navigate future and past broadcasts, an additional dimension of relatedness is added to the high dimensional space into which each channel is projected, corresponding to time. When mapped into a lower dimension, the time dimension then contributes to the map, and a user will discover that in certain regions of the map, local "schedules" of a channel will appears along certain arbitrary mapping-specific axes.

Figure 9:
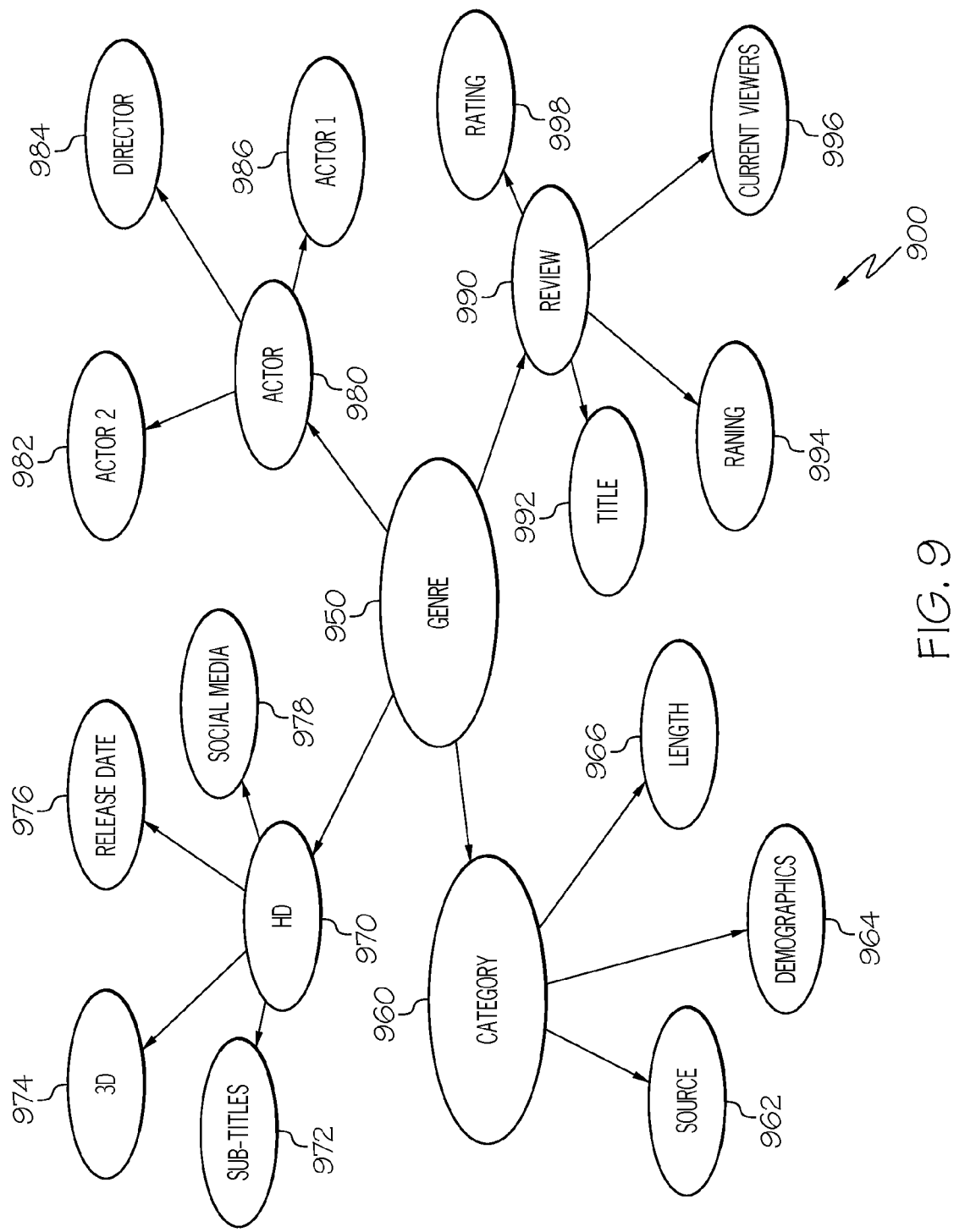
FIG. 9 is a presentation in a cluster arrangement of a multimedia guide or channel guide using a subset of the table entries from FIG. 1.

FIG. 9 is a presentation in a cluster arrangement 900 of a multimedia guide or channel guide using a subset of the multi-dimensional data table 100 from FIG. 1. In this user interface example, the current channel is shown in the center 950. Each of the circular shape 960 through 996 represents informational descriptors i.e. columns of multi-dimensional data table 100. A user can navigate from circular shape to circular shape 950 to 960 through 996 to view multimedia content with a given informational descriptor. The size of the circular shape can represent additional information to the user. In one example larger circular shapes representing a larger collection of the multimedia content with this informational descriptor. Whereas, a smaller circular shape represents a smaller collection of multimedia content.

The present invention is adapted to be easily deployed with a touch screen or gesture based interface. For example, disclosed is channel surfing on touchscreen computer, with pinching and zoom to activate n-dimension relatedness browsing using an embedding algorithm. With a touch screen, a user can navigate in 2D. In 3D, a user can fly through SOURCES 102. Avatars may be used to represent the user. For example, an avatar gesture, movement, flying, and walking may be used to traverse SOURCES 102.

When a user is making use of a smartphone that acts as a TV remote control, gestures may be made on the smartphone screen to indicate up-down and "right-left" dimensions. For example, a swipe of the finger right and left may allow the remote to enter the non-traditional browsing dimensions. Some elements of the navigation interface are ideally implemented with gesture capable devices. For example on a smartphone the user could navigate a traditional EPG (electronic program guide) or traditional navigation on an application using single finger gestures. Then changing to two finger gestures of the same type could activate the multi-dimensional navigations. For example, a user swipes down to find a show on a channel (sorted alphabetically), then swipes left to see what is playing at various times (time dimension, single finger gesture). The user sees a program his is interested in and then uses a two finger swipe to the left to show what other programs that are of a similar genre. Next, the user selects one of those shows and does a two finger swipe upwards to show other programs with similar actors.

Figure 10:
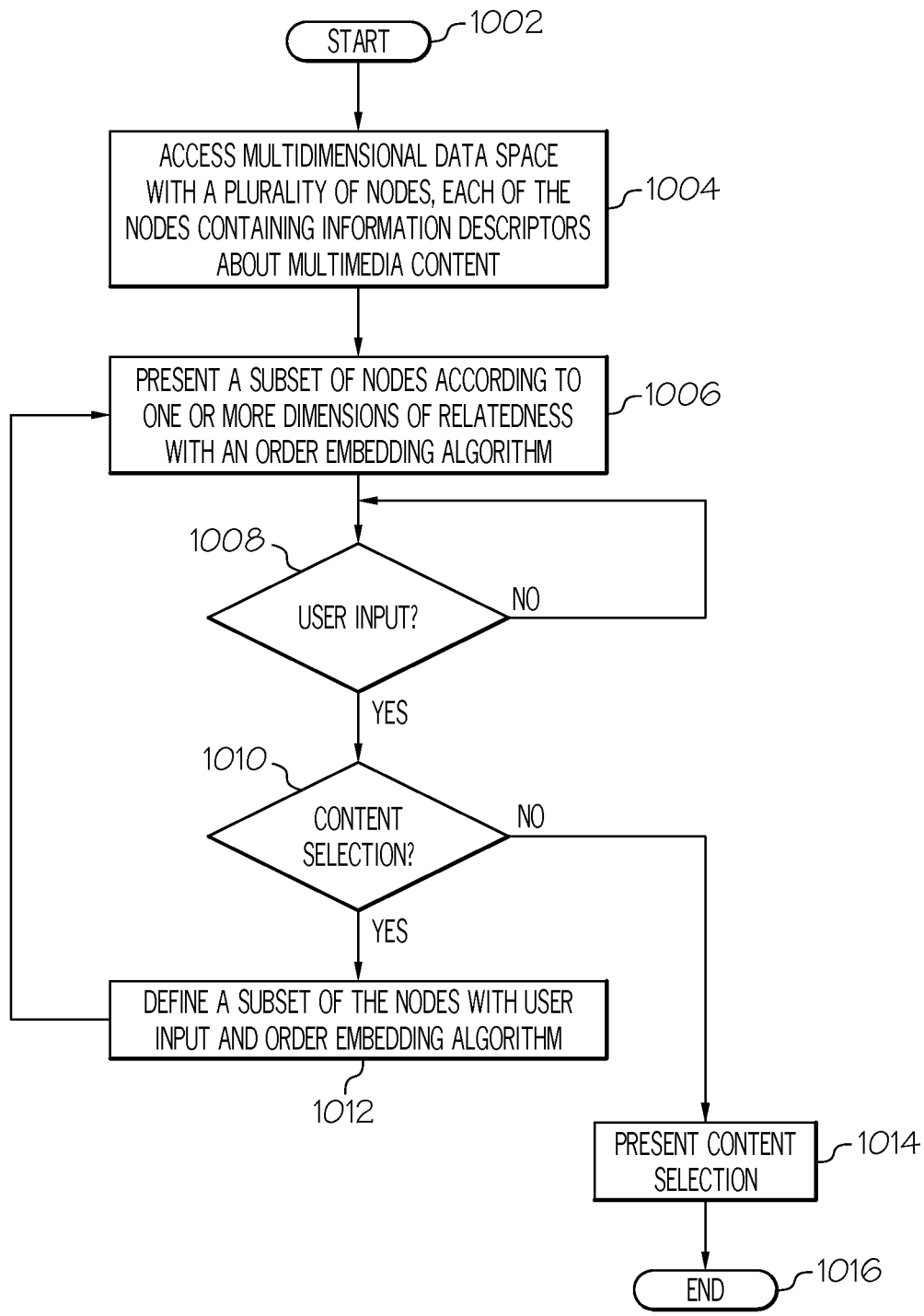
FIG. 10 is a flow chart of an operational phase of carrying out the present invention.

Turning now to FIG. 10, shown is a flow chart of an operational phase of carrying out the present invention. The flow chart begins in step 1002 and immediately proceeds to access multi-dimensional data space in step 1004. The multi-dimensional data space in one example is the multi-dimensional data table 100 of FIG. 1, which can be stored locally on a user's device such as a computer or portable device or remotely on a telecommunications network such as the Internet. The multi-dimensional data includes nodes (i.e. the rows in FIG. 1) with informational descriptors (i.e. the columns in FIG. 1) about the multimedia content.

In step 1006, a subset of nodes is presented according to one or more dimensional of relatedness with an order embedding algorithm. This presentation can be in many different arrangements including a multi-dimensional grid, a graphical tree structure, a hub and spoke arrangement, an elastic map, or a combination of these. The starting presentation may be any of FIGS. 2-9. In step 1008 this starting presentation is presented to the user until input is received. Once user input is received in step 1008 the process continues to step 1010 in which a determination is made whether multimedia content was selected or a dimension in the multi-dimensional data space selected. In the case multimedia content is selected, and then the process continues to step 1014 where the content is presented and the process end in step 1016.

On the other hand, if the user input in step 1008 is not content selection in step 1010, the user input is to select dimensional information in the multi-dimensional data space and the presentation is updated and the process returns to step 1006.

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 11:
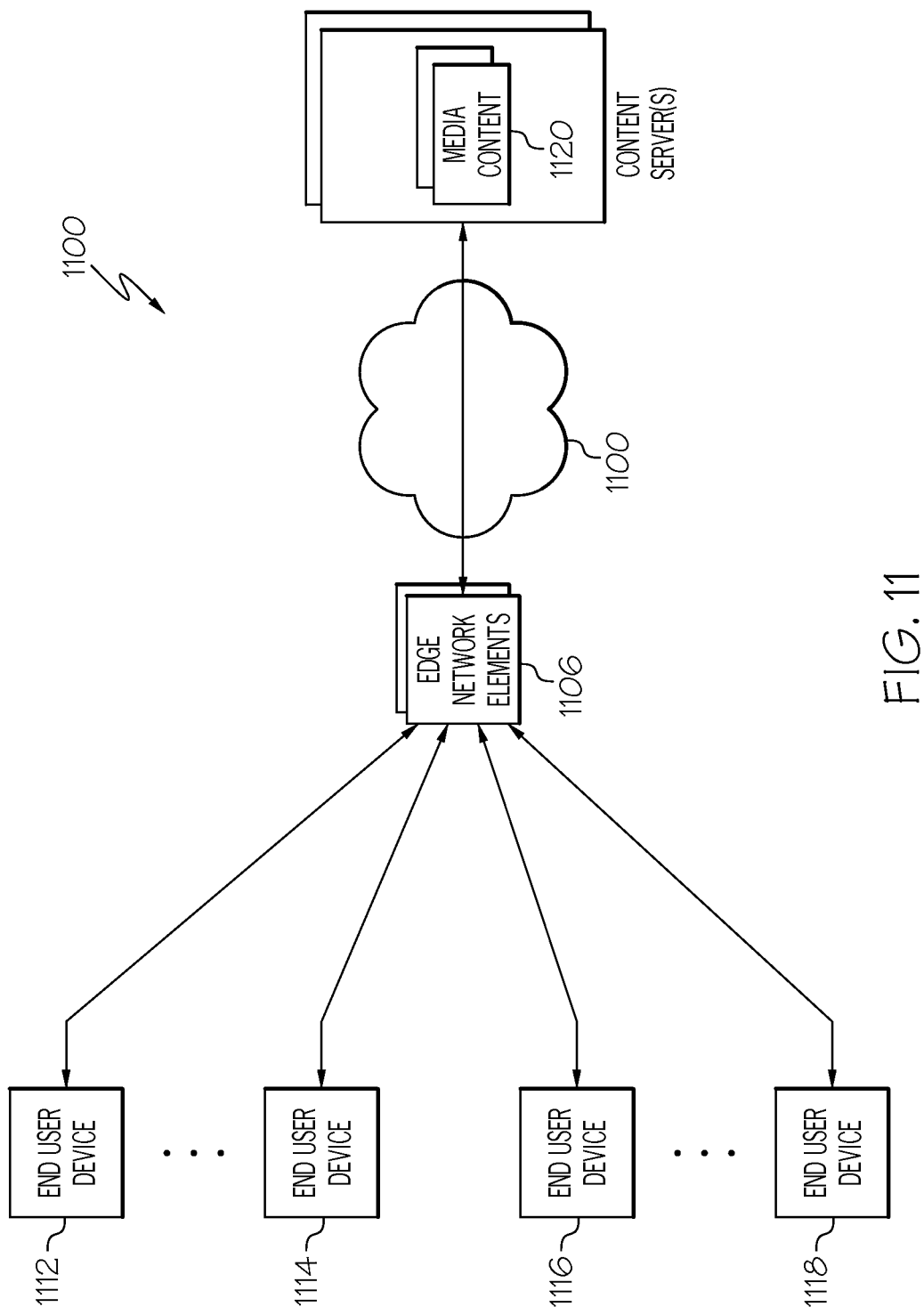
FIG. 11 is a block diagram illustrating an operating environment of a multi-dimensional channel directory system.

FIG. 11 shows an operating environment 1100 according to one embodiment of the present invention. As shown, one or more content servers 1102 are communicatively coupled to a delivery network 1104 such as, but not limited to, the Internet or any other telecommunications network comprising wired and/or wireless technologies. The delivery network 1104 comprises various network elements/nodes such as routers and switches. One or more edge network nodes/elements 1106 reside at the edge of the delivery network 1104. The edge network nodes 1106 transfer traffic from the delivery network 1104 to one or more edge networks, and vice versa. End network nodes 1108 and 1110 (such as routers and switches) are communicatively coupled to the edge network nodes 1106. The end network nodes 1108 and 1110 are within end networks that interface directly with end user devices 1112, 1114, 1116, and 1118. Examples of end user devices are laptop computers, notebook computers, personal computers, tablet computing devices, wireless communication devices, Personal Digital Assistants, gaming units, and the like.

In this exemplary embodiment, the content server 1102 comprises media content such as audio, video, and text that can be provided to end user devices. Media content can either be live or pre-stored. Live media content is generated in real-time by a content service provider and captured by the content server 1102. The content server 1102 provides the live media content to requesting end user devices. Examples of live media content are video and audio of sporting events, news events, and so on that are provided by various content service providers. Pre-stored media content is content that is not generated in real-time but instead has been previously generated/created and can be accessed at any point in time by end user devices. Examples of pre-stored media content are movie files, audio files, and so on. In this embodiment, the content server hosts the pre-stored media content and is considered the content service provider because the end user devices 1112-1118 request the content directly from the content server 1102. However, in another embodiment, other servers host the pre-stored media content and are considered the content service providers. The content service providers send their content to the end user devices 1112-1118 through the content server 1102.

The media content 1120 is provided to the end user devices 1112-1118 via one or more media streaming services ("service" or "streaming service"), which provide one or more content streams to the end user devices 1112-1118. Streaming refers to the process of continuously transmitting data from a source device (e.g., the content server) to a target device (e.g., an end user device), with the target device processing the data as it is received. For example, an end user device 1112 is able to view portions of a video file as they are received from the content server 1102 without having to first store the entire video file. Examples of streaming services are a real-time streaming service for providing a content stream comprising live audio/video to the end user devices, an audio streaming service for providing a content stream comprising pre-stored audio media content to the end user devices, and a movie streaming service for providing a content stream comprising pre-stored movie content to the end user devices.

An end user device 1112 sends a request to the content server 1102 for specific media content 1120, a specific service, or both. For example, an end user device 1112 can send a request to the content server 1102 for a specific movie to be streamed to the device via a movie streaming service. As another example, the end user device 1112 can send a request for an audio streaming service, which streams various audio content items within the media content 1120 to the device. While examples are given with respect to media streaming services requested by end user devices, embodiments of the present invention also apply to other types of data content requested by end user devices.

In one example, the end user device 1112-1118 communicatively coupled to a web application or cloud service running on the content server 1102. The web application or service acts as an aggregator of user-specific information, provided by other web applications, cloud services, websites (including music streaming, social networking, service-specific user configuration sites, etc.) each of which supports aggregation interfaces (compliant with the site, or via standard public interfaces). The web application or service is maintained by a provider, who is responsible for designing and assigning algorithms for transforming specific user data extracted from these interfaces into a set of scalar measures along a proscribed dimension. Combined, these dimensions then create the multi-dimensional space into which SOURCES 102 are projected, and from which a lower-dimensional map for channel surfing is constructed. The service performs this transformation, and through a standard interface over the Internet, serves the map to the set top box.

Figure 12:
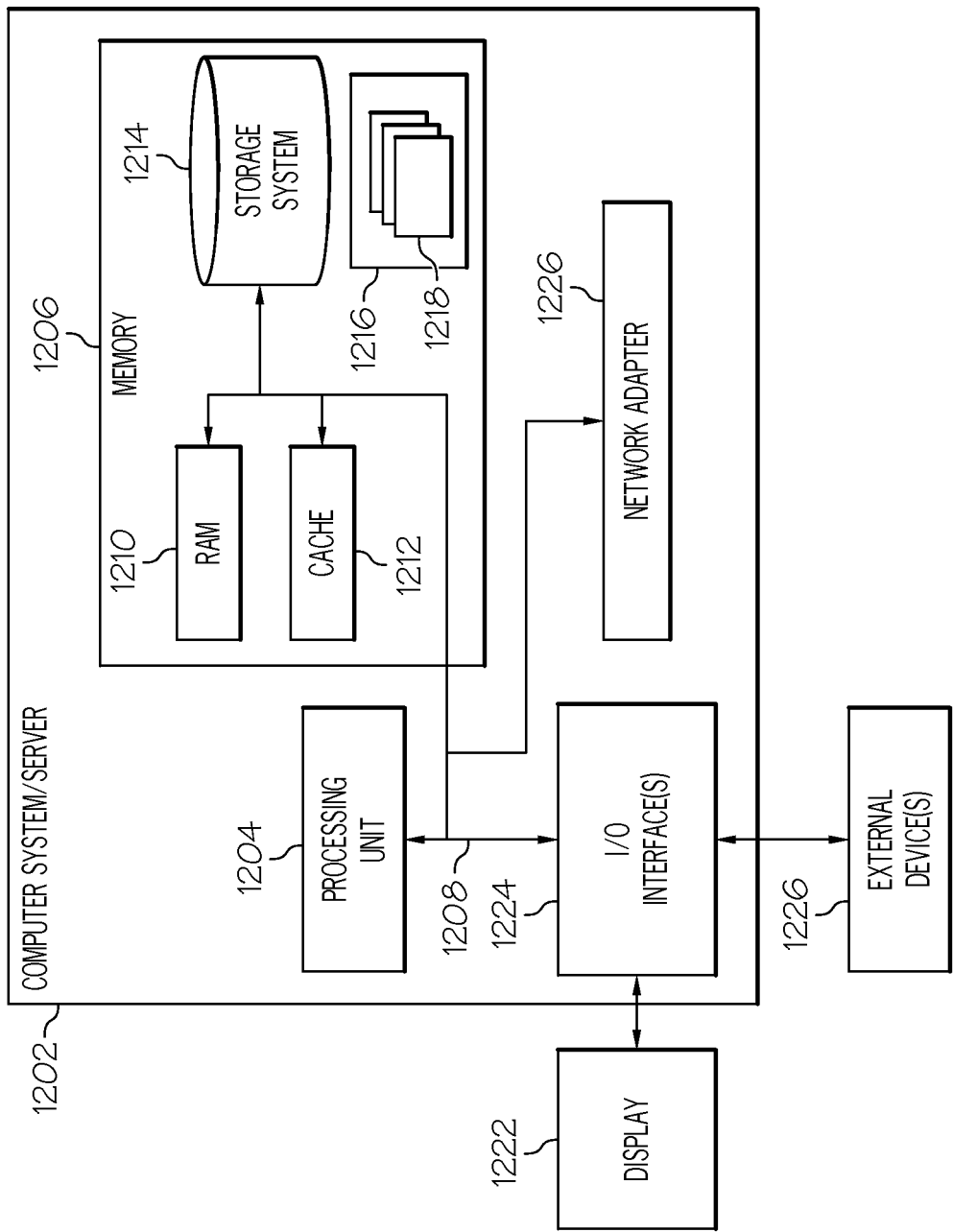
FIG. 12 is a block diagram illustrating a detailed view of an information processing system for carrying out the operation of FIG. 10.

FIG. 12 shows a schematic of an example information processing system 1202 for use in embodiments of the present invention. Information processing system 1202 is only one example of a suitable system and is not intended to limit the scope of use or functionality of embodiments of the present invention described above. The exemplary information processing system 1202 is capable of implementing and/or performing any of the functionality set forth above.

The information processing system 1202 can be a networking node/element such as (but not limited to) the end user device 1112 through 1118, the content server 1102, and the edge network element 1106, a personal computer system, a server computer system, a thin client, a thick client, a handheld or laptop device, a tablet computing device, a multiprocessor system, a microprocessor-based system, a set top box, a programmable consumer electronic, a network PC, a minicomputer system, a mainframe computer system, a distributed cloud computing system, or the like.

As illustrated in FIG. 12, the information processing system 1202 is in the form of a general-purpose computing device. The components of the information processing system 1202 can include, but are not limited to, one or more processors or processing units 1204, a system memory 1206, and a bus 1208 that couples various system components including the system memory 1206 to the processor 1204.

The bus 1208 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The information processing system 1202 typically includes a variety of computer system readable media. Such media may be any available media that is accessible by the information processing system 1202, and it includes both volatile and non-volatile media, removable and non-removable media.

The system memory 1206, in one embodiment, comprises an order embedding algorithm and its components for relatedness detection, the content service provider information 210, the service state information 212, and the rules base 214 and rules 216. These one or more components can also be implemented in hardware. The system memory 1206 can include computer system readable media in the form of volatile memory, such as random access memory (RAM) 1210 and/or cache memory 1212. The information processing system 1202 can further include other removable/non-removable, volatile/non-volatile computer system storage media. By way of example only, a storage system 1214 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1208 by one or more data media interfaces. The memory 1206 can include at least one program product having a set of program modules that are configured to carry out the functions of an embodiment of the present invention.

Program/utility 1216, having a set of program modules 1218, may be stored in memory 1206 by way of example, and not limitation, as well as an operating system, one or more application programs, other program modules, and program data. Each of the operating system, one or more application programs, other program modules, and program data or some combination thereof, may include an implementation of a networking environment. Program modules 1218 generally carry out the functions and/or methodologies of embodiments of the present invention.

The information processing system 1202 can also communicate with one or more external devices 1220 such as a keyboard, a pointing device, a display 1222, etc.; one or more devices that enable a user to interact with the information processing system 1202; and/or any devices (e.g., network card, modem, etc.) that enable the information processing system 1202 to communicate with one or more other computing devices. Such communication can occur via I/O interfaces 1224. Still yet, the information processing system 1202 can communicate with one or more networks such as a local area network (LAN), a general wide area network (WAN), and/or a public network (e.g., the Internet) via network adapter 1226. As depicted, the network adapter 1226 communicates with the other components of information processing system 1202 via the bus 1208. Other hardware and/or software components can also be used in conjunction with the information processing system 1202. Examples include, but are not limited to: microcode, device drivers, redundant processing units, external disk drive arrays, RAID systems, tape drives, and data archival storage systems.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A non-transitory computer program product for presenting a listing of multimedia content, the computer program product comprising:
   a non-transitory storage medium readable by a processing circuit and storing instructions for execution by the processing circuit configured to perform accessing a multi-dimensional data space with a plurality of nodes, each of the nodes containing a set of informational descriptors about multimedia content;
receiving user input of at least one dimension of relatedness for the set of informational descriptors;
defining a subset of the plurality of nodes with the at least one dimension of relatedness using an order embedding algorithm and the user input; and
based on receiving
a single finger swipe gesture, presenting the subset of the plurality of nodes in a two-dimensional grid with a first axis representing a multimedia source and a second axis representing time, and
at least a two finger swipe gesture, presenting the subset of the plurality of nodes in a multi-dimensional grid with at least three axes.

2. The non-transitory computer program product of claim 1, wherein the accessing the multi-dimensional data space with the plurality of nodes includes accessing multi-dimensional space from a provider of the multimedia content.

3. The non-transitory computer program product of claim 2, wherein the accessing the multi-dimensional data space with the plurality of nodes includes accessing multi-dimensional space from a social network.

4. The non-transitory computer program product of claim 2, wherein the informational descriptors includes each of a genre of the multimedia content, a title of the multimedia content, and a length of the multimedia content.

5. A system for presenting a listing of multimedia content, the system comprising:
a memory;
a processor communicatively coupled to the memory, where the processor is configured to perform
accessing a multi-dimensional data space with a plurality of nodes, each of the nodes containing a set of informational descriptors about multimedia content;
receiving user input of at least one dimension of relatedness for the set of informational descriptors;
defining a subset of the plurality of nodes with the at least one dimension of relatedness using an order embedding algorithm and the user input; and
based on receiving
a single finger gesture, presenting the subset of the plurality of nodes in a two-dimensional grid with a first axis representing a multimedia source and a second axis representing time, and
at least a two finger gesture, presenting the subset of the plurality of nodes in a multi-dimensional grid with at least three axes.

6. The system of claim 5, wherein the accessing the multi-dimensional data space with the plurality of nodes includes accessing multi-dimensional space from a provider of the multimedia content.

7. The system of claim of claim 6, wherein the accessing the multi-dimensional data space with the plurality of nodes includes accessing multi-dimensional space from a social network.

8. The system of claim 6, wherein the informational descriptors includes each of a genre of the multimedia content, a title of the multimedia content, and a length of the multimedia content.

9. The system of claim of claim 8, wherein the informational descriptors includes one or more of close captioning content, reviews of the multimedia content, MPAA rating of the multimedia content, directors of the multimedia content, writers of the multimedia content, actors in the multimedia content, title of multimedia content, and release date of the multimedia content.

10. The non-transitory computer program product of claim 4, wherein the informational descriptors includes one or more of close captioning content, reviews of the multimedia content, MPAA rating of the multimedia content, directors of the multimedia content, writers of the multimedia content, actors in the multimedia content, title of multimedia content, and release date of the multimedia content.

11. A method for presenting a listing of multimedia content, the method comprising:
accessing a multi-dimensional data space with a plurality of nodes, each of the nodes containing a set of informational descriptors about multimedia content;
receiving user input of at least one dimension of relatedness for the set of informational descriptors;
defining a subset of the plurality of nodes with the at least one dimension of relatedness using an order embedding algorithm and the user input; and
based on receiving
a single finger swipe gesture, presenting the subset of the plurality of nodes in a two-dimensional grid with a first axis representing a multimedia source and a second axis representing time, and
at least a two finger swipe gesture, presenting the subset of the plurality of nodes in a multi-dimensional grid with at least three axes.

12. The method of claim 11, wherein the accessing the multi-dimensional data space with the plurality of nodes includes accessing multi-dimensional space from a provider of the multimedia content.

13. The method of claim 12, wherein the accessing the multi-dimensional data space with the plurality of nodes includes accessing multi-dimensional space from a social network.

14. The method of claim 12, wherein the informational descriptors includes each of a genre of the multimedia content, a title of the multimedia content, and a length of the multimedia content.

15. The method of claim 14, wherein the informational descriptors includes one or more of close captioning content, reviews of the multimedia content, MPAA rating of the multimedia content, directors of the multimedia content, writers of the multimedia content, actors in the multimedia content, title of multimedia content, and release date of the multimedia content.

16. The method of claim 11, wherein the using the order embedding algorithm and the user input to define the subset of the plurality of nodes with the at least one dimension of relatedness further includes using an interest of a user.

17. The method of claim 11, wherein the receiving user input includes receiving user input from at least of one of a mouse, a keyboard, a remote control, a touch screen, voice, and a user gesture.

18. The method of claim 11, wherein the using the order embedding algorithm is an elastic map algorithm, a topographic ICA algorithm, and a Kohonen algorithm.

19. The method of claim 11, wherein the using an order embedding algorithm is at least one of an elastic map algorithm with an approximation energy (spring constant) set to relatedness of the nodes in the subset of the plurality of nodes.

20. The method of claim 11, wherein the presenting the subset of the plurality of nodes includes presenting the nodes in a series of concentric rings with rings closer to a center having a higher degree of relatedness as compared with rings further from the center.

\* \* \* \* \*